United States Patent
Hatano

(10) Patent No.: US 7,852,524 B2
(45) Date of Patent: Dec. 14, 2010

(54) IMAGE READING DEVICE AND AN IMAGE FORMING APPARATUS

(75) Inventor: Takashi Hatano, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1001 days.

(21) Appl. No.: 11/624,557

(22) Filed: Jan. 18, 2007

(65) Prior Publication Data

US 2007/0177220 A1 Aug. 2, 2007

(30) Foreign Application Priority Data

Jan. 19, 2006 (JP) ............................. 2006-011445

(51) Int. Cl.
H04N 1/04 (2006.01)
H04N 1/40 (2006.01)
H04N 1/393 (2006.01)

(52) U.S. Cl. ........................ 358/496; 358/474; 358/449; 358/451; 358/488; 358/296

(58) Field of Classification Search ................ 358/496, 358/498, 296, 449, 451, 401, 488, 474; 382/298, 382/318, 319, 312; 399/81
See application file for complete search history.

(56) References Cited

U.S. PATENT DOCUMENTS

| | | | |
|---|---|---|---|
| 5,576,848 A | 11/1996 | Kusano et al. | |
| 5,771,104 A | 6/1998 | Sakano | |
| 6,621,992 B2 * | 9/2003 | Kishi et al. | ................... 399/81 |
| 2002/0048413 A1 * | 4/2002 | Kusunoki | ................... 382/282 |

FOREIGN PATENT DOCUMENTS

| | | |
|---|---|---|
| JP | 61-166265 | 7/1986 |
| JP | 62-32762 | 2/1987 |
| JP | 64-69373 | 3/1989 |
| JP | 4-207756 | 7/1992 |
| JP | 9-19424 | 1/1997 |
| JP | 2004-112240 | 4/2004 |
| JP | 2004-120597 | 4/2004 |
| JP | 2004-289272 | 10/2004 |

* cited by examiner

*Primary Examiner*—Cheukfan Lee
(74) *Attorney, Agent, or Firm*—Oblon, Spivak, McClelland, Maier & Neustadt, L.L.P.

(57) ABSTRACT

An image reading device includes an image reader, which reads an original into image data by scanning the original in the main scanning direction at an image reading width while the original is being fed in a sub scanning direction; and a controller, which inputs reading settings information and set the image reading width to a maximum reading width of the image reader when the reading settings information includes a user instruction for setting the image reading width to the maximum reading width.

17 Claims, 11 Drawing Sheets

IMAGE READING DEVICE AND AN IMAGE FORMING APPARATUS

CROSS-REFERENCE TO RELATED APPLICATIONS

This patent application is based on and claims priority under 35 U.S.C. §119 to Japanese patent application No. 2006-011445 filed on Jan. 19, 2006, in the Japanese Patent Office, the entire contents of which are hereby incorporated by reference.

FIELD

Example embodiments of the present invention relate generally to an image reading device, and an image forming apparatus provided with the image reading device.

DESCRIPTION OF THE RELATED ART

An image forming apparatus is usually provided with an image reading device for reading an original into image data, and an image forming device for forming an image on a recording sheet according to the image data. In order to make a copy of the original, the image reading device automatically detects a size of the original with reference at a reading reference point, and reads the original by scanning an image reading area that matches the detected size of the original. Further, the image forming apparatus may automatically select a recording sheet that matches the detected size of the original. The image forming device forms the image of the original on the recording sheet with reference at a writing reference point.

However, there may be some situations in which the image reading device fails to correctly read the original into image data. In one example, when the original has a custom size not detectable by the image forming apparatus, the size of the original may be detected to be smaller than the actual size of the original. In such case, a portion of the original may not be read, since the size of the image reading area may be set smaller than the actual original size. In another example, when the original is not placed at the right position relative to the reading reference point, the size of the original may be detected to be smaller than the actual size of the original such that a portion of the original may not be read.

In addition, when the reading reference point differs from the writing reference point, there may be some situations in which the image forming device fails to correctly form the image according to the image data onto the recording sheet. In one example, when the original size is different from the size of the recording sheet, the image generated according to the image data may not be formed onto the right position of the recording sheet. As illustrated in FIG. 1, the image reading device may read the original with reference at the center Co of an original table. In this example, the original is placed on the original table such that the center of the original corresponds to the center Co of the original table. Thus, the center Ci of the image data read from the original, corresponds to the center Co of the original table. The image forming device may form the image according to the image data with reference at a side of the recording sheet. When the size of the recording sheet is different from the size of the original, the center Ci of the image data to be formed on the recording sheet may be different from the center Cs of the recording sheet, which corresponds to the center Co of the original table. When the size of the original is greater than the size of the recording sheet, a portion of the original may not be formed on the recording sheet.

SUMMARY

Example embodiments of the present invention include an image reading device capable of reading an original into image data by scanning the original in the main scanning direction at an image reading width while the original is being fed in a sub-scanning direction. When a user instruction for setting the image reading width to the maximum reading width is input, the image reading width is set to a maximum reading width. The image reading device may be provided with an image forming apparatus.

Further, when the user instruction for setting the image reading width to the maximum reading width is input, a position of the image data read from the original may be adjusted relative to a reference point such that the center of the image data to be formed on the recording sheet matches the center of the recording sheet.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
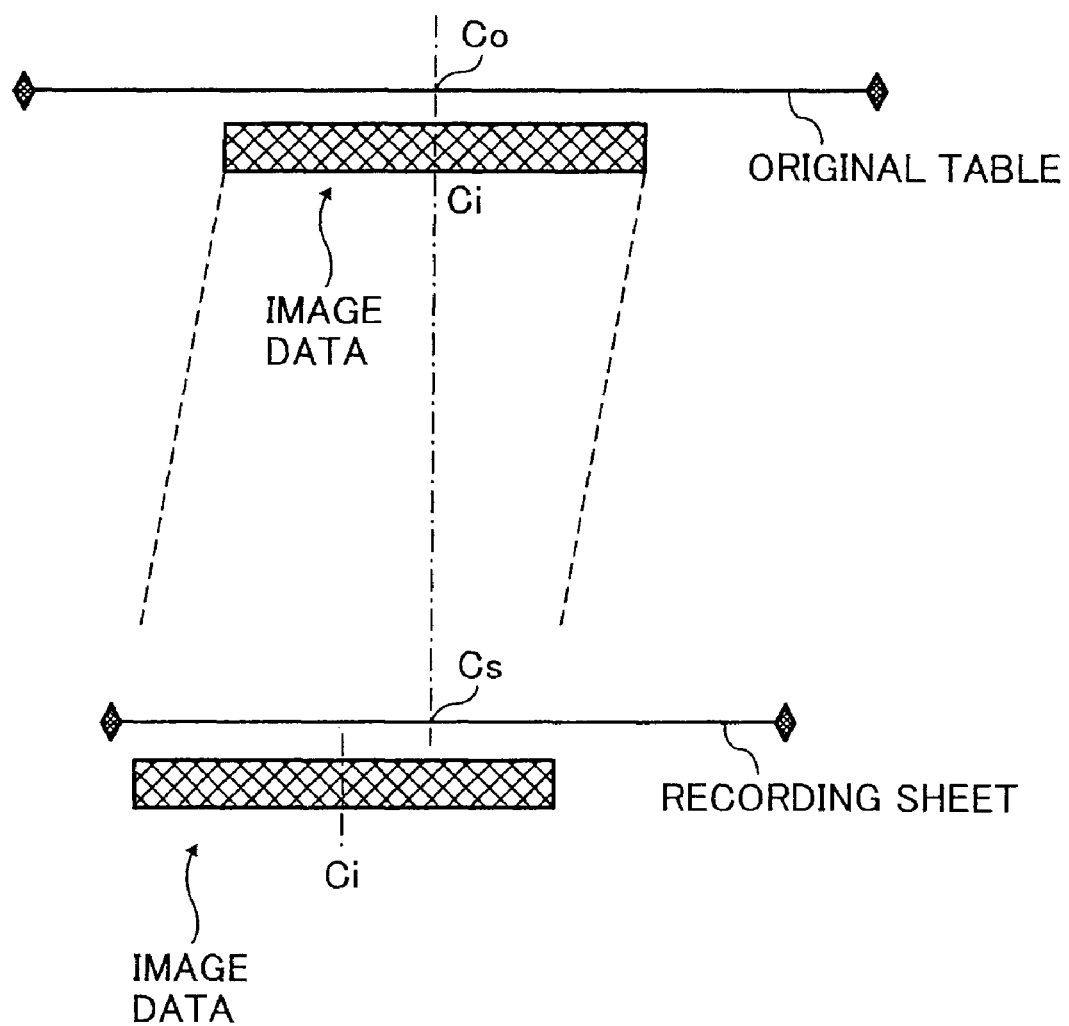
FIG. 1 is an illustration for explaining reading an original into image data, and forming an image according to the image data on a recording sheet having a size different from the size of the original.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Figure 2:
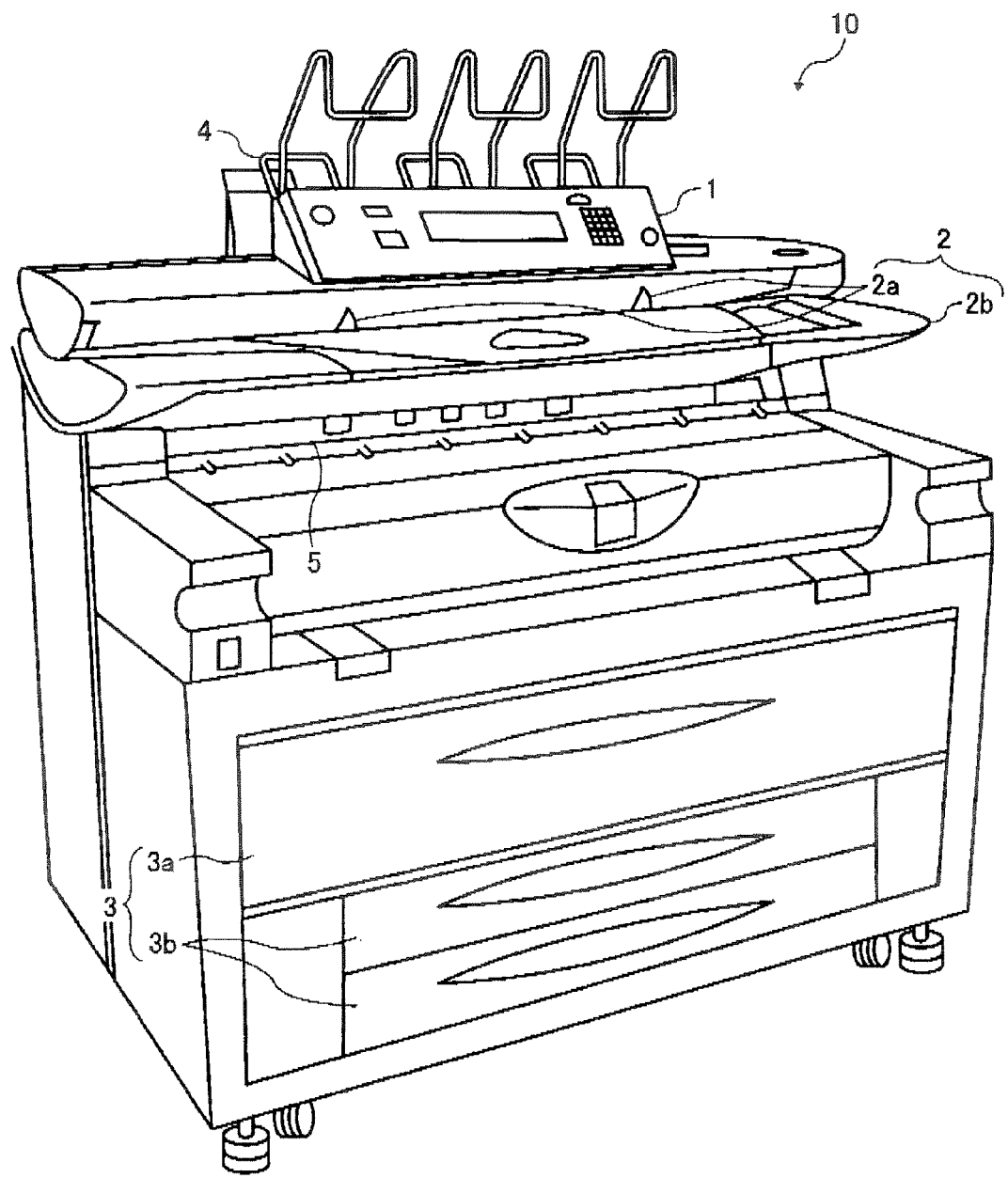
FIG. 2 is a perspective view illustrating the outer appearance of an image forming apparatus according to an example embodiment of the present invention.

Referring now to the drawings, wherein like reference numerals designate identical or corresponding parts throughout the several views, FIG. 2 illustrates the outer appearance of an image forming apparatus 10 according to an example embodiment of the present invention. As illustrated in FIG. 2, the image forming apparatus 10 includes an operation control section 1, an original input section 2, a sheet storage section 3, a first output section 4, and a second output section 5.

The operation control section 1 may be implemented by a control panel, which may include a plurality of keys, and/or a display panel 240 (FIG. 5) that may function as a touch-panel screen. In addition, any desired device having the function of communicating with a user, such as a speaker, a buzzer, or a microphone, may be provided. Using the operation control section 1, a user may instruct the image forming apparatus 10 to perform various kinds of operation including scanning, printing, copying, or faxing.

Below the operation control section 1, the original input section 2 is provided, which may include an original guide 2a, which may be optionally provided, and an original table 2b. As illustrated below referring to FIG. 5, the user may place the original onto the original table 2b. Further, as described below referring to FIG. 4, the original input section 2 may detect the width of the original ("the original width") using one or more sensors. In this specification, the original width corresponds to the length of the original in the main scanning direction, while the original length corresponds to the length of the original in the sub-scanning direction.

Referring back to FIG. 2, the sheet storage section 3, which is provided at a lower portion of the image forming apparatus 10, may include a roll paper tray 3a, and/or one or more cut paper cassettes 3b. In this example, the roll paper tray 3a includes a first paper holder capable of holding a paper roll having the width of 841 mm, and a second paper holder capable of holding another paper roll having the width of 728 mm. In this example, the cut paper cassettes 3b include a first paper cassette capable of storing a stack of cut paper having the A2 size, and a second paper cassette capable of storing another stack of cut paper having the A3 size. However, the width of paper roll or the size of cut paper may be changed according to the user preference.

The first output section 4, which is provided at an upper portion of the image forming apparatus 10, may hold a recording sheet being discharged from the image forming apparatus 10. The second output section 5, which is provided between the original input section 2 and the sheet storage section 3, may hold a recording sheet being discharged from the image forming apparatus 10.

Figure 3:
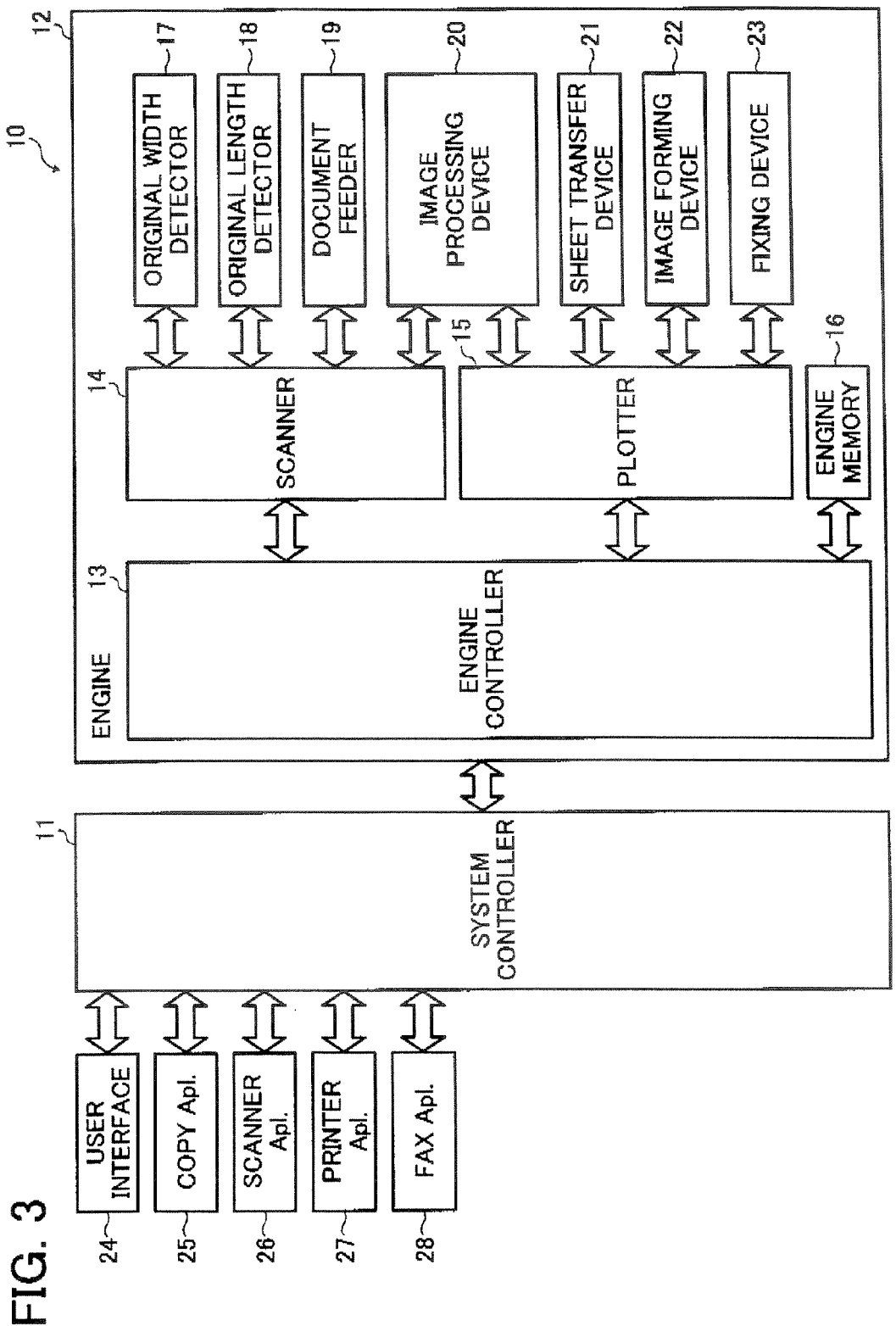
FIG. 3 is a schematic block diagram illustrating an example electrical structure of the image forming apparatus shown in FIG. 2.

FIG 3 illustrates an example electrical structure of the image forming apparatus 10 shown in FIG. 2. The image forming apparatus 10 includes a system controller 11 and an engine 12, which are coupled with each other through an interface, such as a bus. The image forming apparatus 10 may further include a user interface 24, a copy application 25, a scanner application 26, a printer application 27, and a facsimile ("fax") application 28. In addition to the applications 25, 26, 27, and 28, the image forming apparatus 10 may include one or more applications, for example, a web application that allows the image forming apparatus 10 to communicate with one or more apparatuses via a network, such as the Internet.

The system controller 11 is coupled to each one of the copy application 25, the scanner application 26, the printer application 27, and the fax application 28, via an interface, such as a bus. The system controller 11 may cause the image forming apparatus 10 to operate according to at least one of the copy application 25, the scanner application 26, the printer application 27, and the fax application 28. The copy application 25 may be executed to control an operation of copying. The scanner application 26 may be executed to control an operation of scanning. The printer application 27 may be executed to control an operation of printing. The fax application 28 may be executed to control an operation of faxing. When the web application is provided as described above, the web application may be executed to control an operation of communicating via the network.

Figure 5:
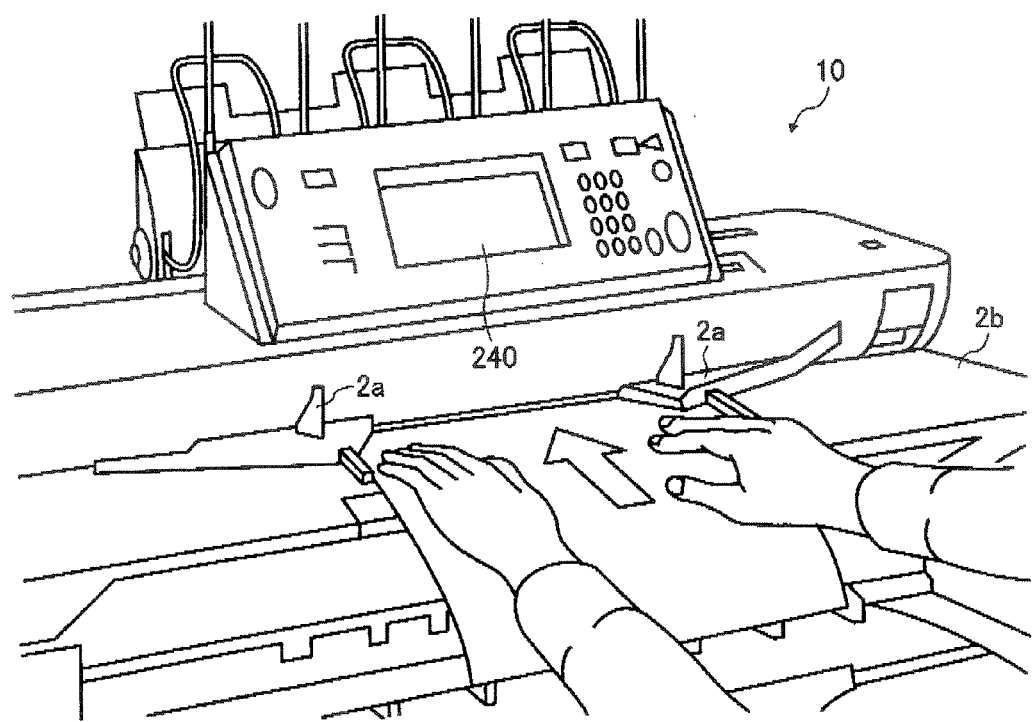
FIG. 5 is a perspective view illustrating a portion of the image forming apparatus shown in FIG. 2.

The system controller 11 is further coupled to the user interface 24 via an interface. The user interface 24 may allow the user to communicate with the image forming apparatus 10 through the operation control section 1 of FIG. 2. For example, the user may instruct the image forming apparatus 10 to perform at least one of the operations of copying, scanning, printing, and faxing, by selecting at least one of the plurality of keys or by selecting a desired portion of the display panel 240 (FIG. 5). Upon receiving the user instruction from the user interface 24, the system controller 11 may output a controller instruction to at least one of the applications 25, 26, 27, and 28, and the engine 12. In another example, the system controller 11 may output a controller instruction to the user interface 24, which requests the user interface 24 to notify the user of status information regarding the image forming apparatus 10 Upon receiving the controller instruction, the user interface 24 causes the display panel 240 to display a message corresponding to the status information.

The engine 12 includes an engine controller 13, a scanner 14, a plotter 15, an engine memory 16, an original width detector 17, an original length detector 18, a document feeder 19, an image processing device 20, a sheet transfer device 21, an image forming device 22, and a fixing device 23. The engine controller 13 may cause at least one of the devices in the engine 12 to perform at least one of the plurality of functions of copying, scanning, printing, and faxing, according to the controller instruction received from the system controller 11.

For example, the scanner 14 performs the function of scanning, using the original width detector 17, the original length detector 18, the document feeder 19, and/or the image processing device 20. The original width detector 17 obtains the original width, which may be detected by at least one of a plurality of sensors provided in the original input section 2. The original length detector 18 obtains the original length, for example, by counting a time period it takes for the scanner 14 to scan the entire portion of the original. The document feeder 19 feeds the original in the sub-scanning direction. The image processing device 20 may apply various image processing to image data read from the original. In operation, the scanner 14 reads an original into image data, by scanning the original, which is fed in the sub-scanning direction by the document feeder 19, in the main scanning direction with reference at a reading reference point. In this example, the reading reference point corresponds to the center Co of the original table 2b ("the original table center Co") shown in FIG. 4. The image data read from the original may be further processed by the image processing device 20. The processed, or unprocessed, image data may be stored in a memory, such as the engine memory 16.

In another example, the plotter 15 performs the function of printing, using the image processing device 20, the sheet transfer device 21, the image forming device 22, and/or the fixing device 23. The image processing device 20 may apply various image processing to image data to be printed. The sheet transfer device 21 transfers a recording sheet. The image forming device 22 forms an image on the recording sheet according to the image data. For example, the image forming device 22 may form an electrostatic latent image based on the image data, develops the latent image into a toner image, and transfers the toner image onto the recording sheet. The fixing device 23 fixes the image onto the recording sheet. In operation, the plotter 15 forms an image according to image data onto a recording sheet with reference at a writing reference point. In this example, the writing reference point corresponds to a side of the recording sheet.

In another example, the engine controller 13 may cause the scanner 14 and the plotter 15 to together perform the function of printing. In operation, he scanner 14 may read an original into image data with reference at the reading reference point. The plotter 15 form an image on a recording sheet according to the image data with reference at the writing reference point.

The engine memory 16 may store various data including, for example, information input by the user through the user interface 24, which may be sent to the engine 12 through the system controller 11.

Figure 4:
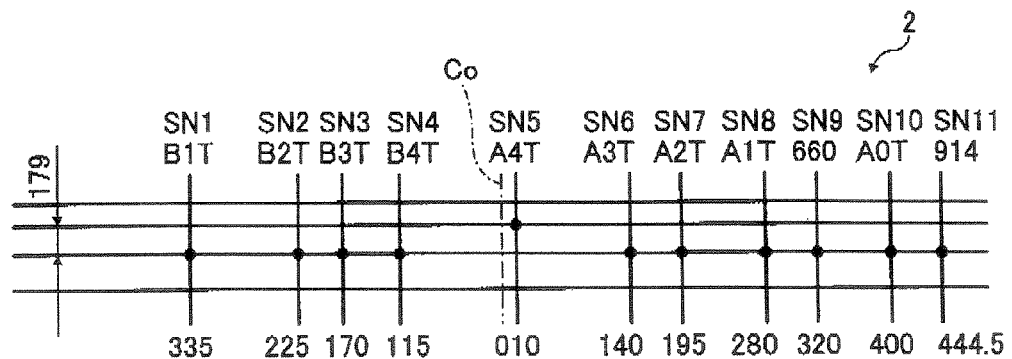
FIG. 4 is an illustration for explaining the arrangement of a plurality of sensors provided in the image forming apparatus shown in FIG. 2.

As described above referring to FIG. 2 or 3, the original input section 2 includes the plurality of sensors, which may be collectively referred to as the original width detector 17 (FIG. 3), at its inner portion. The original width detector 17 may be implemented by an optical sensor, for example, a reflective photodeflector or a transmissive photointerrupter. In this example, as illustrated in FIG. 4, eleven sensors SN1 to SN11 are arranged along the main scanning direction from one end to the other end. However, the number of sensors may not be limited to this example. Using the sensors SN 1 to SN11, the original width may be detected when the original is placed on the original table 2b, for example, as illustrated in FIG. 5. Further, in this example, the sensor SN5 of FIG. 4, which is provided near the original table center Co, is positioned at the location closer to the user in the sheet feeding direction indicated by the arrow in FIG. 5. The sensor SN5 outputs a detection signal when the sensor SN5 detects the original placed on the original table 2b. After the original is detected by the sensor SN5, the original width may be detected using the original width detector 17. In one example, the original width may be detected based on the Japanese Industrial Standards, such as JIS-B series or JIS-A series. Alternatively, the original width may be detected based on the architecture series or the engineering series. Further, in this example, the original width may be expressed in any desired unit, such as based on metrics system or inches. The detected original width may be used to determine the size of the recording sheet to be used, while considering information regarding the magnification ratio.

For example, referring back to FIG. 4, the sensor SN1, which is provided at the position located 335 mm away from the original table center Co, detects whether the original has the width of 728 mm and determines whether to use the 728 mm width roller paper, the B1T paper, or B2T paper when magnification ratio is 100%. The sensor SN2, which is provided at the position located 225 mm away from the original table center Co, detects whether the original has the width of 515 mm and determines whether to use the 515 mm width roller paper, the B2T paper, or B3T paper when magnification ratio is 100% The sensor SN3, which is provided at the position 170 mm away from the original table center Co, detects whether the original has the width of 364 mm and determines whether to use the 364 mm width roller paper, or the B3T paper when magnification ratio is 100%. The sensor SN4, which is provided at the position 115 mm away from the original table center Co, detects whether the original has the width of 257 mm and determines whether to use the 257 mm width roll paper or the B4T paper when magnification ratio is 100%. The SN5, which is provided at the position located 10 mm away from the original table center Co, detects whether the original has the width of 210 mm and determines whether to use the 210 mm width roll paper or the A4T paper when magnification ratio is 100%. The sensor SN6, which is provided at the position located 140 mm away from the original table center Co, detects whether the original has the width of 297 mm and determines to use the 297 mm width roll paper or the A3T paper when magnification ratio is 100%. The sensor SN7, which is provided at the position located 195 mm away from the original table center Co, detects whether the original has the width of 420 mm and determines to use the 420 mm width roll paper, the A2T paper, or the A3T paper when magnification ratio is 100%. The sensor SN8, which is provided at the position located 280 mm away from the original table center Co, detects whether the original has the width of 594 mm and determines to use the 594 mm width roll paper, the A1T paper, or the A2T paper when magnification ratio is 100%. The sensor SN9, which is provided at the position located 320 mm away from the original table center C, detects whether the original has the width of 660 mm, and determines to use the 660 mm width roll paper when magnification ratio is 100%. The sensor SN10, which is provided at the position located 400 mm away from the original table center Co, detects whether the original has the width of 841 mm determines to use the 841 mm width paper roller, the A0T paper, or the A1T paper when magnification ratio is 100%. The sensor SN11, which is provided at the position located 444.5 mm away from the original table center Co, determines a maximum reading width of the scanner 14 or the image forming apparatus 10. The maximum reading width may be defined as the maximum width that the scanner 14, or the image forming apparatus 10, is capable of reading. In this example, the maximum reading width is set to 914 mm. However, the maximum reading width may be specific to each image reading device or image forming apparatus. The position of each sensor or the detectable size of each sensor may be specific to each image reading device or image forming apparatus.

Still referring to FIG. 4, all of the sensors SN1 to SN11, except for the sensor SN5, are arranged along a straight line perpendicular to the sheet feeding direction indicated by the arrow shown in FIG. 5. As described above referring to FIG. 5, the sensor SN5, which has the function of detecting the original being placed on the original table 2b, is arranged at the location upperstream in the sheet transfer direction. In this example, as illustrated in FIG. 4, the sensor SN5 is provided at the location 179 mm away from the locations of the other sensors in the sheet transfer direction toward the user.

While the original width may be detected by the original width detector 17, there are some example cases in which the original width may not be correctly detected. In one example, when the center of the original is not placed at the original table center Co, which functions as the reading reference point of the scanner 14, the original width may not be correctly detected. In another example, when the original width is different from any one of the original widths detectable by one of the sensors SN1 to SN11, the original width may not be correctly detected. When the original width is not correctly detected, the scanner 14 may not be able to scan the entire portion of the original since the scanner 14 reads, by default, the original at an image reading width determined based on the detected original width.

In view of the above, the image reading width of the scanner 14 may be set to the maximum reading width, by default. The scanner 14 is able to scan the entire portion of the original, even when the center of the original is not placed at the original table center Co or even when the original has the custom size.

Alternatively, the image reading width of the scanner 14 may be set to the maximum reading width, by default according to a user preference. In one example, the user preference may be input by the user through the operation control section 1 (FIG. 2). In another example, when the image forming apparatus 10 is connected to the network, such as a local area network (LAN) or the Internet, the user preference may be input by the user through an input device, such as a mouse or a keyboard, provided at the user site.

Alternatively, the image reading width of the scanner 14 may be set to the maximum reading width according to a user instruction for setting the image reading width to the maximum reading width. For example, when printing the custom size original, the user may input the user instruction, which causes the image forming apparatus 10 to read the original at the maximum reading width. Upon receiving the user instruction, the image reading width of the scanner 14 may be changed, from the default image reading width, to the maximum reading width. In this example, the default image reading width may be determined based on the detected original width. For example, the default image reading width may be set substantially equal to the detected original width. Alternatively, the default image reading width may be determined based on a recording sheet size, if the recording sheet size is known. Since the image reading width of the scanner 14 is changed to the maximum reading width only when the user desires, the work required by the scanner 14, including the memory space used for storing the image data, may be reduced when compared with the above-described case of reading the original at the maximum reading width by default. In this example, as described below referring to FIG. 6, the user instruction may be input by the user through the operation control section 1 (FIG. 2). Alternatively when the image forming apparatus 10 is connected to the network, such as the LAN or the Internet, the user instruction may be input by the user through the input device, such as the mouse or the keyboard, provided at the user site.

On the other hand, as illustrated in FIG. 1, when the reading reference point and the writing reference point are different from each other, the image data may not be formed onto the right position on the recording sheet.

In view of the above, the image forming apparatus 10 may be provided with the function of adjusting the position of the image data in the main scanning direction relative to the reference point such that the center of the image data to be formed on the recording sheet matches the center of the recording sheet. In one example, the position of the image data may be adjusted by shifting the position of a reading start point of the image data read from the original relative to the reference point in the main scanning direction. In another example, the position of the image data may be adjusted by shifting the position of the image data read from the original relative to the reference point in the main scanning direction. In addition to adjusting the position of the image data, data may be deleted from the image data or added to the image data.

Figure 6:
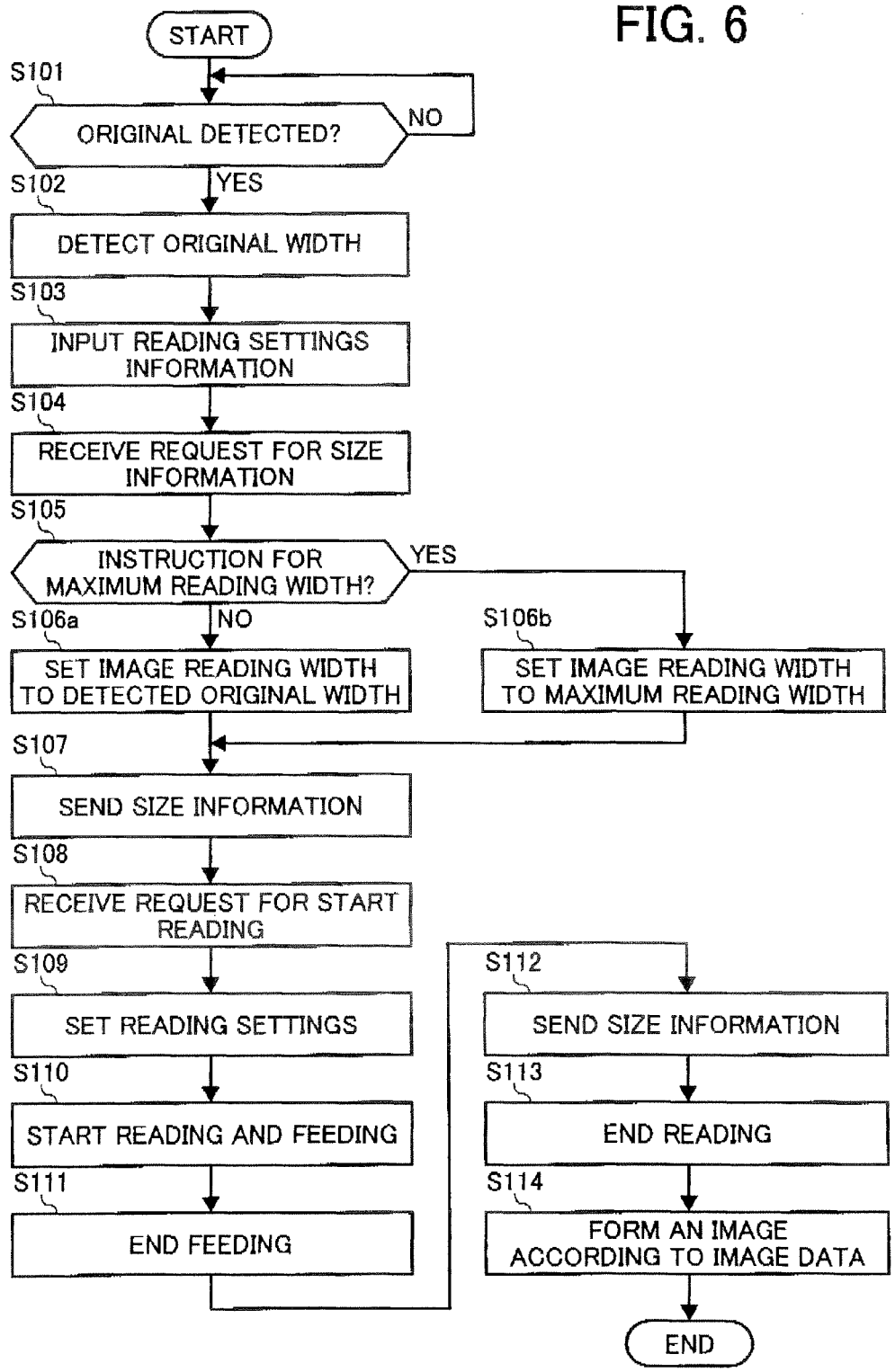
FIG. 6 is a flowchart illustrating operation of copying an original, performed by the image forming apparatus shown in FIG. 2, according to an example embodiment of the present invention.

Referring now to FIG. 6, operation of copying an original, performed by the image forming apparatus 10, is explained according to an example embodiment of the present invention. The operation of FIG. 6 may be performed by the engine controller 13 of FIG. 3, according to a user instruction received through the system controller 11 of FIG. 3. In this example, the user instruction may be received by the user through the operation control section 1 (FIG. 2), including the display panel 240 (FIG. 5). Alternatively, the user instruction may be received by the user through an input device provided at the user site, when the image forming apparatus 10 is connected to the network.

Figure 7:
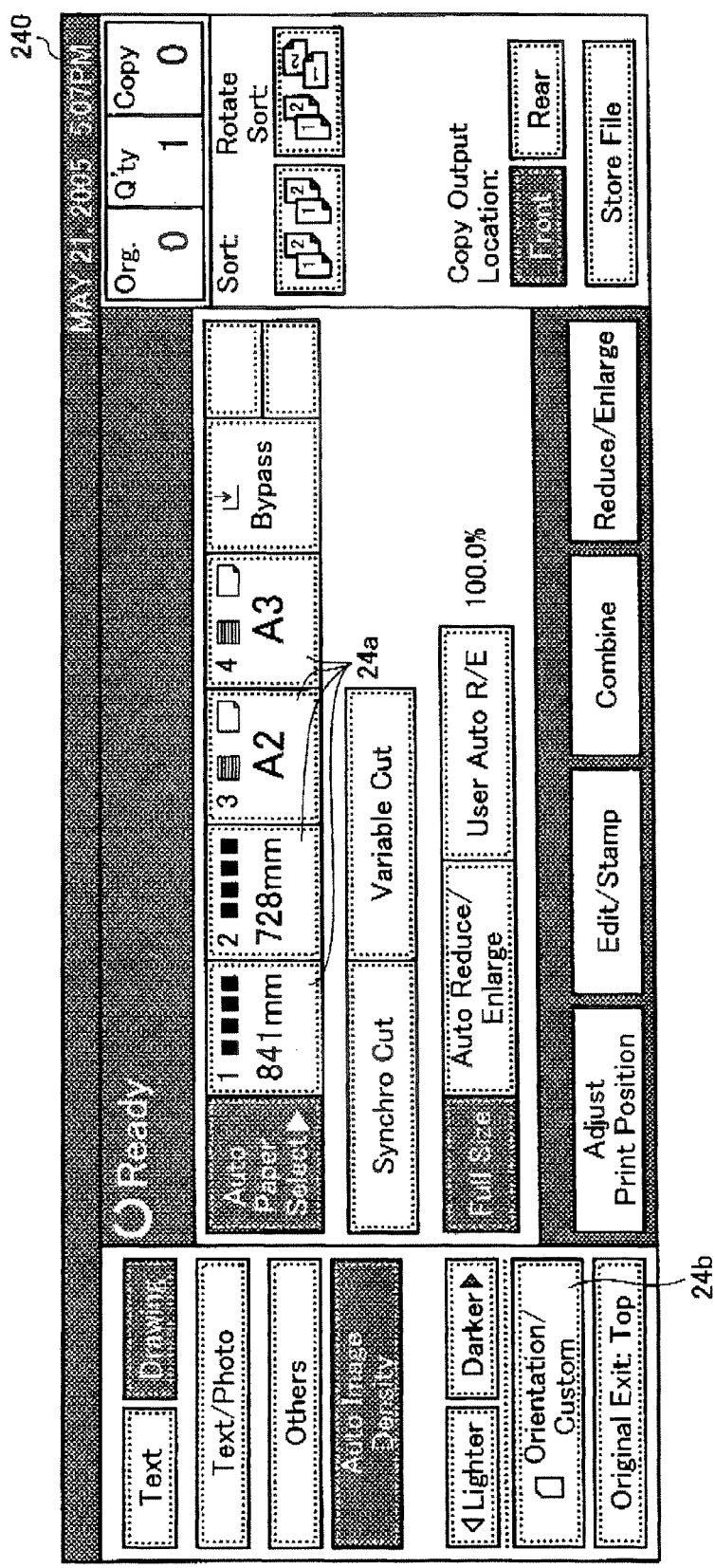
FIG. 7 is a plan view illustrating an example screen displayed by a display panel of the image forming apparatus shown in FIG. 2, when the operation of FIG. 6 is performed.

In this example, the image forming apparatus 10 displays the screen illustrated in FIG. 7 on the display panel 240, when the power is turned on or the copy function is selected. Referring to FIG. 7, the "Auto Paper Select" key is selected by default. When the "Auto Paper Select" key is selected, the image forming apparatus 10 automatically selects a recording sheet for copying based on the magnification ratio and/or the original width detected by the original width detector 17. The user may disable this auto paper select function, by selecting at least one of the "tray" keys 24a, or selecting the "Bypass" key. In this example, the auto paper select function is set by default. However, the user may change the default settings, using the operation control section 1. The screen displayed by the display panel 240, for example, information indicated by the "tray" keys 24a, may be changed according to the recording sheets stored in the image forming apparatus 10.

Still referring to FIG. 7, in this example, the "Full Size" key is selected by default. When the "Full Size" key is selected, the image forming apparatus 10 sets the magnification ratio to 100%. However, the user may change the magnification ratio, by selecting any one of the "Auto Reduce/Enlarge (R/E)" key, the "User Auto R/E" key, or the "Reduce/Enlarge" key.

Referring back to FIG. 6, S101 determines whether the original is detected by the sensor SN5. As described above, the engine controller 13 receives the detection signal from the sensor SN5 when the original is detected by the sensor SN5. If the original is detected ("YES" at S101), the operation proceeds to Step S102. Otherwise ("NO" at S101), the operation repeats Step S101. In this example, the center of the original may not be placed at the original table center Co, as long as the original is placed at a portion on the original table 2b detectable by the sensor SN5.

S102 detects the original width using the original width detector 17. At this time, the detected original width may be stored in the engine memory 16.

Further, at S102, the engine controller 13 may send a request to the system controller 11 to notify the user when the original width is not detectable by the original width detector 17. For example, when the detected original width does not match the width of any one of the recording sheets stored in the image forming apparatus 10, the engine controller 13 may send a request to disable the auto paper select function. Accordingly, the system controller 11 may cause the display panel 240 to change the appearance of the "Auto Paper Select" key to indicate that the auto paper selection function is disabled. Alternatively, the display panel 240 may display an error message, which requests the user to select one of the "tray" keys 24a or replace the tray with a suitable recording sheet.

S103 inputs information regarding various reading settings ("the reading settings information"). In one example, the reading settings information, which may be input by the user through the operation control section 1, may be input to the system controller 11 through the user interface 24. The system controller 11 sends the reading settings information to the engine controller 13. The engine controller 13 may store the reading settings information in the engine memory 16.

In one example, the user may specify the recording sheet for use, by selecting at least one of the "tray" keys 24a displayed on the display panel 240. Information regarding the recording sheet ("the recording sheet information"), such as the size or width of the recording sheet, may be sent to the engine 12 through the system controller 11. At this time, the recording sheet information may be stored in the engine memory 16. For example, when the user desires to copy the original onto a recording sheet having a specific size or width, the user may select at least one of the "tray" keys 24a.

In another example, the user may specify whether to reduce or enlarge the size of the original, by selecting at least one of the "Auto R/E" key, the "User Auto R/E" key and the "Reduce/Enlarge" key, which are displayed on the display panel 240. Information regarding the magnification ratio between the original image and the copied image ("the magnification information"), such as the magnification ratio, may be sent to the engine 12 through the system controller 11. At this time, the magnification information may be stored in the engine memory 16.

In another example, the user may instruct the image forming apparatus 10 to set the image reading width to the maximum reading width For example, when the use desires to copy the custom size original, the user may select the "Orientation/Custom" key 24b shown in FIG. 7. When the "Orientation/Custom" key 24b is selected, the display panel 240 changes the screen shown in FIG. 7 to the screen shown in FIG. 8. The user may further select the "Wide Scan" key 24c, for example, when the user desires to change the image reading width of the scanner 14 to the maximum reading width. When the "Wide Scan" key 24c is selected, the auto paper select function is disabled such that the "Auto Paper Select" key is not highlighted. Instead, one of the "tray" keys 24a may be highlighted, for example, the first tray key corresponding to the 841 mm width roll paper as illustrated in FIG. 8.

Figure 8:
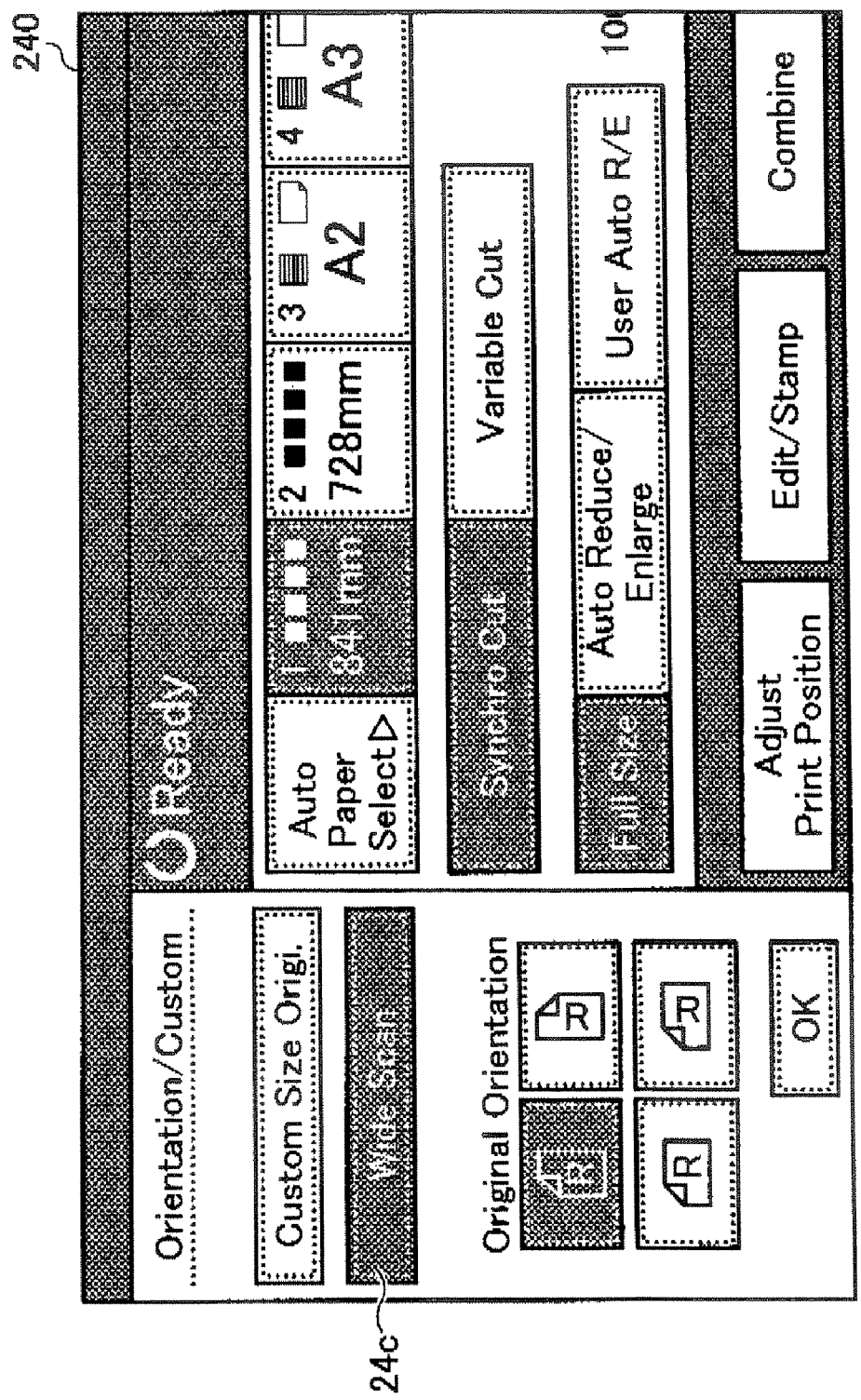
FIG. 8 is a plan view illustrating a portion of an example screen displayed by the display panel of the image forming apparatus shown in FIG. 2, when the operation of FIG. 6 is performed.

Still referring to FIG. 8, when the roll paper is selected, the "Synchro Cut" key may be selected by default. When the "Synchro Cut" key is selected, the image forming apparatus 10 cuts the roll paper at the length determined based on the original length detected by the original length detector 18. The user may disable this function, for example, by selecting the "Variable Cut" key. When the "Variable Cut" key is selected, the image forming apparatus 10 cuts the roll paper at the length specified by the user. Further, when the roll paper is selected, the "Original Orientation" key indicating the orientation of the original being fed may be automatically highlighted as illustrated in FIG. 8.

Referring back to FIG. 6, at S104, the engine controller 13 receives, from the system controller 11, a request for information regarding the original size ("the size information"), which may be defined by the original width and the original length.

At S105, the engine controller 13 determines whether the user instruction for setting the image reading width to the maximum reading width is received from the user through the system controller 11 at S103. If the user instruction for the maximum reading width is not received, i.e., the "Wide Scan" key 24c is not selected at S103 ("NO" at S105), the operation proceeds to S106a. If the user instruction for the maximum reading width is received, i.e., the "Wide Scan" key 24c is selected at S103 ("YES" at S105), the operation proceeds to S106b.

At S106a, the engine controller 13 sets the image reading width, which may be considered the same as the original width in this example, to be substantially equal to the detected original width obtained at S102.

At S106b, the engine controller 13 sets the image reading width, which may be considered the same as the original width in this example, to be equal to the maximum reading width according to the user instruction received at S103.

At S107, the engine controller 13 sends the size information to the system controller 11 in response to the request received at S104. For example, when the image reading width is set based on the detected original width at S106a, the engine controller 13 sends the detected original width as the original width. In another example, when the image reading width is set equal to the maximum reading width at S106b, the engine controller 13 sends the maximum reading width as the original width. Further, at this time, the original length may be sent to the system controller 11, if the original length is input at S103, for example, by selecting the cut paper from the "tray" keys 24a. The size information sent to the system controller 13 at this time may be changed or updated in the step described below.

At S108, the engine controller 13 receives a controller instruction for starting reading operation, from the system controller 11.

At S109, the engine controller 13 sets the reading settings of the scanner 14 according to various information obtained in the previous steps, including the reading settings information obtained at S103 or information regarding the detected original width obtained at S102. At this time, the reading settings may be set such that the position of the image data can be adjusted after the image data is read from the original, for example, as described below referring to FIG. 9. In one example, the position of the image data may be adjusted by shifting the position of the reading start point relative to the reference point, for example, as described below referring to FIGS. 9 and 10. In another example, the position of the image data may be adjusted by shifting the position of the image data read from the original relative to the reference point, for example, as described below referring to FIGS. 9 and 11.

Referring back to FIG. 6, at S 110, the engine controller 13 causes the scanner 14 to start reading the original according to the reading settings set at S109. At this time, the document feeder 19 may start feeding the original in the sheet transfer direction, i.e. the sub-scanning direction. Further, at this time, the original length detector 18 may start counting a time period it takes the scanner 14 to scan the entire portion of the original. The counted time period may be used to determine the original length, when the roll paper is selected at S103.

At S111, the engine controller 13 causes the document feeder 19 to end feeding. At this time, the original length detector 18 may end counting the time period.

At S112, the engine controller 13 sends the size information to the system controller 11. At this time, the original length detector 18 may output information regarding the detected original length, for example, when the roll paper is selected at S103.

At S113, the engine controller 13 causes the scanner 14 to end reading to complete reading operation. At this time, the image data read by the scanner 14, which may be processed by the image processing device 20 (FIG. 3) according to the reading settings set at S109, may be stored, for example, in the engine memory 16.

At S114, the engine controller 13 may further cause the plotter 15 to form an image according to the image data on the recording sheet, and the operation ends.

In this example, scanning and printing operations are both performed by the image forming apparatus 10 to complete copying. However, the printing operation may be performed by another image forming apparatus, which may be coupled to the image forming apparatus 10 via the network. In such ease, S114 of FIG. 6 is not performed by the image forming apparatus 10.

Figure 9A:
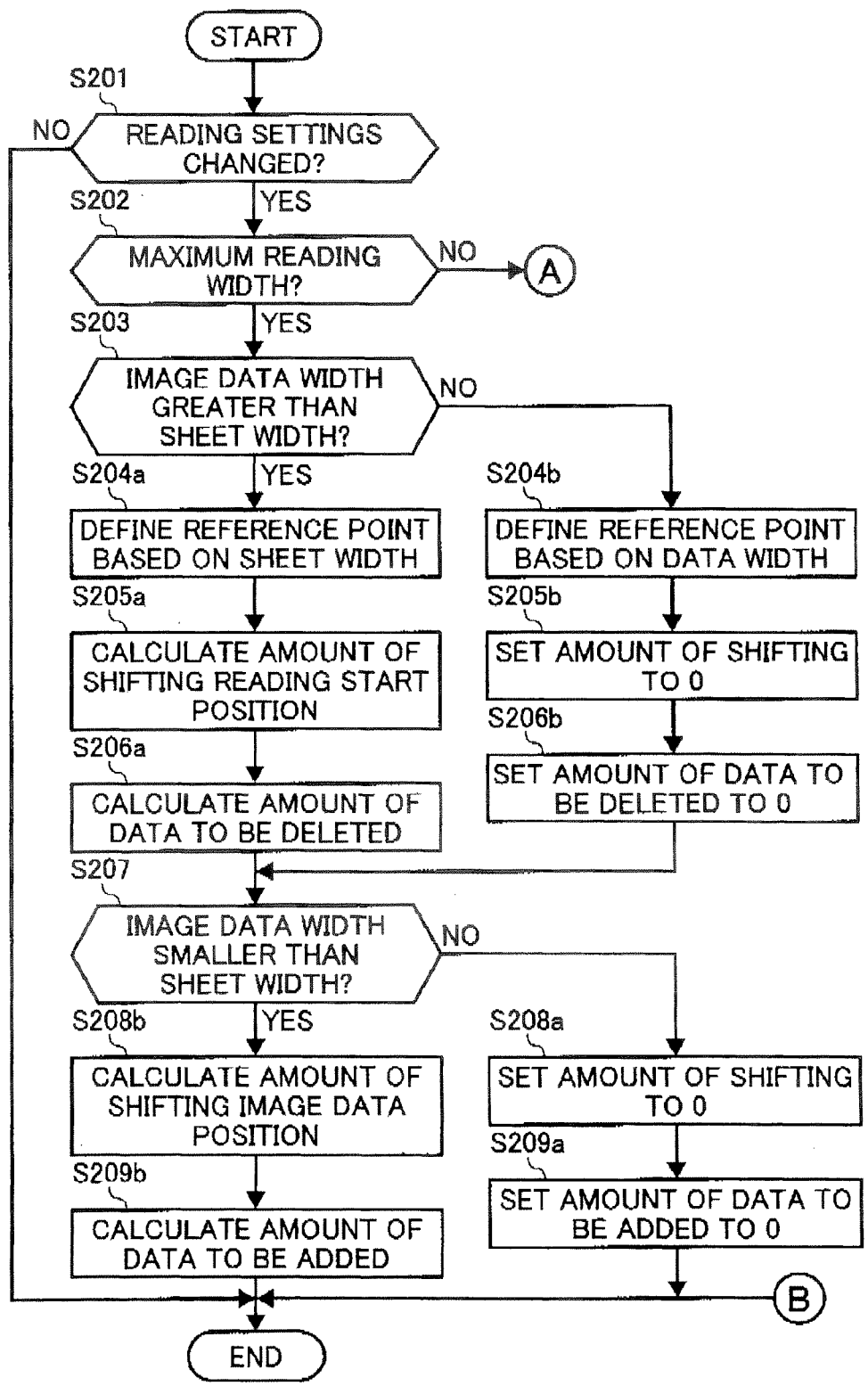
FIG. 9 is a flowchart illustrating operation of adjusting a position of image data, performed by the image forming apparatus shown in FIG. 2, according to an example embodiment of the present invention.
Figure 9B:
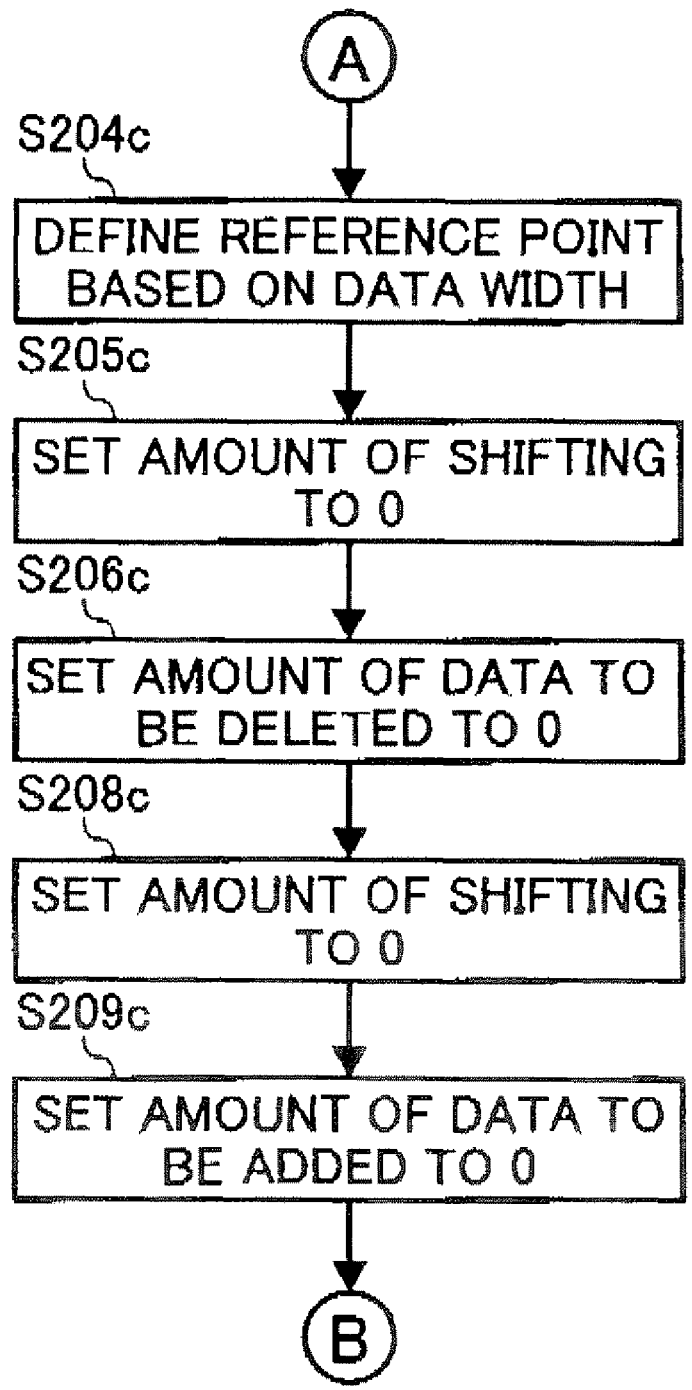

Referring now to FIG. 9, operation of adjusting the position of the image data, which may be performed by the engine controller 13 at S109 of FIG. 6, is explained according to an example embodiment of the present invention.

Referring to FIG. 9, Step S201 determines whether the reading settings are changed, for example, by comparing the reading settings information received by the engine controller 13 at S103 of FIG. 6 with reading setting information stored in the engine memory 16. If the image reading settings are not changed ("NO" at S201), the operation ends to proceed to S110 of FIG. 6. In this manner the overall processing speed of the image forming apparatus 10 may be reduced. If the image reading settings are changed ("YES" at S201), the operation proceeds to Step S202. As described above referring to FIG. 6, the reading settings information may include, for example, information whether the user instruction for setting the image reading width to the maximum reading width is received, the magnification information, and/or the recording sheet information.

S202 determines whether the image reading width is set to the maximum reading width. If the image reading width is set to the maximum reading width ("YES" at S202), the operation proceeds to S203. Otherwise ("NO" at Step S202), the operation proceeds to S204c, S205c, S206c, S208c, and S209c.

When the image reading width is not set to the maximum reading width, at S204c, the engine controller 13 defines a position of the reference point based on the image data width. In this example, the image data width may be obtained by multiplying the detected original width with the magnification ratio in the main scanning direction. At S205c, the engine controller 13 determines whether to shift the position of the reading start point relative to the reference point Since the image reading width is not set to the maximum reading width, at S205c, the engine controller 13 sets the amount of shifting the position of the reading start point to 0. For the same reason, at S206c, the engine controller 13 sets the amount of data to be deleted from the image data to 0. At S208c, the engine controller 13 determines whether to shift the position of the image data relative to the reference point. Since the image reading width is not set to the maximum reading width, at S208c, the engine controller 13 sets the amount of shifting the position of the image data to 0. For the same reason, at S209c, the engine controller 13 sets the amount of data to be added to the image data to 0, and the operation ends.

When the image reading width is set to the maximum reading width, at S203, the engine controller 13 determines whether the image data width is greater than the recording sheet width. In this example, the image data width may be determined by the multiplication of the maximum reading width and the magnification ratio in the main scanning direction. The maximum reading width is set to 914 mm. The magnification ratio in the main scanning direction may be obtained from the magnification information, which may be input as the reading settings information. The recording sheet width may be obtained from the recording sheet information, which may be input as the reading settings information. If the image data width is greater than the recording sheet width ("YES" at S203), the operation proceeds to S204a, S205a, and S206a. Otherwise ("NO" at S203), the operation proceeds to S204b, S205b, and S206b.

When the image data width is greater than the recording sheet width, at S204a, the engine controller 13 defines a position of the reference point based on the recording sheet width. At S205a, the engine controller 13 determines whether to shift the position of the reading start point relative to the reference point. Since the image reading width is set to the maximum reading width, and the image data width is greater than the recording sheet width, the engine controller 13 determines to shift the position of the reading start point relative to the reference point, and calculates the amount of shifting using the reading settings information. At S206a, the engine controller 13 determines whether to delete data from the image data. Since the image reading width is set to the maximum reading width, and the image data width is greater than the recording sheet width, at S206a, the engine controller 13 calculates an amount of data to be deleted from the image data. The amount of data to be deleted is determined based on the amount of shifting obtained at S205a, and the operation proceeds to S207.

When the image data width is smaller than the recording sheet width, at S204b, the engine controller 13 defines a position of the reading reference point based on the image data width. At S205b, the engine controller 13 determines whether to shift the position of the reading start point relative to the reference point. Since the image reading width is set to the maximum reading width, but the image data width is smaller than the recording sheet width, the engine controller 13 determines not to shift the position of the reading start point relative to the reference point, and sets the amount of shifting to 0. For the same reason, at S206b, the engine controller 13 sets the amount of data to be deleted from the image data to 0, and the operation proceeds to S207.

S207 determines whether the image data width is smaller than the recording sheet width. If the image data width is smaller than the recording sheet width ("YES" at S207), the operation proceeds to S208b and S209b. If the image data width is greater than the recording sheet width ("NO" at S207), the operation proceeds to S208a and S209a.

At S208b, the engine controller 13 determines to shift the position of the image data read from the original relative to the reference point in the main scanning direction, and calculates the amount of shifting using the reading settings information. At S209b, the engine controller 13 calculates an amount of data to be added to the image data, and the operation ends. The amount of data to be added is determined based on the amount of shifting the position of the image data.

At S208a, the engine controller 13 determines not to shift the position of the image data read from the original relative to the reference point, and sets the amount of shifting to 0. At S209a, the engine controller 13 sets the amount of data to be added to the image data to 0, and the operation ends.

The operation of FIG. 9 may be performed in various other ways. For example, the image reading width of the image forming apparatus 10 may be set to the maximum reading width, by default. In such case, the steps including S202, S204c, 205c, 206c, 208c, and 209c may not be performed. However, in this example, the image forming apparatus 10 is capable of processing the image data such that the image data is formed with reference at a side of the recording sheet, when the user instruction for setting the image reading width to the maximum reading width is not received. In this manner, the user is able to easily change the appearance of the resultant image, between the image formed with reference at the center of the recording sheet and the image formed width reference at the side of the recording sheet.

Figure 10:
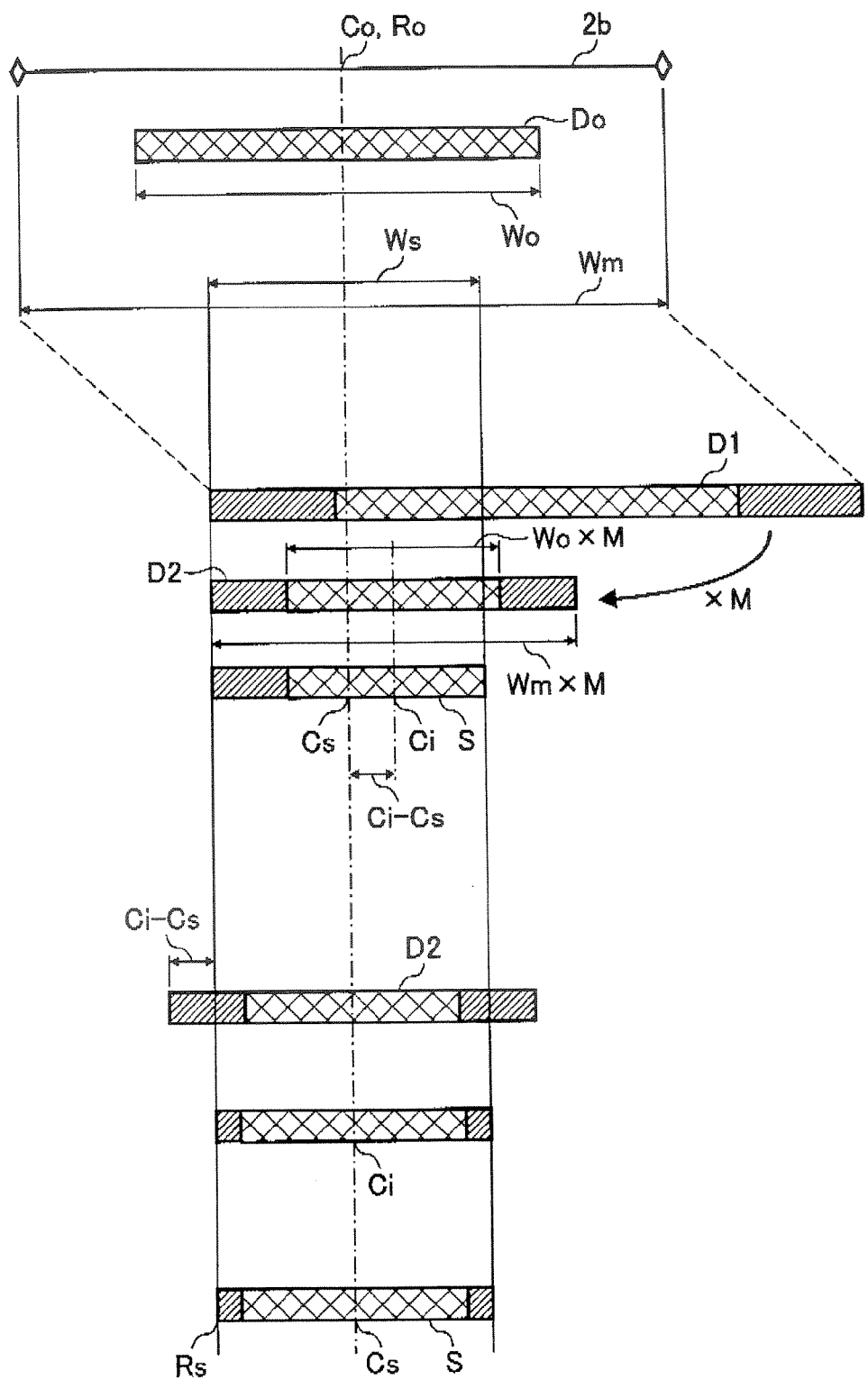
FIG. 10 is an illustration for adjusting a position of image data when copying an original onto a recording sheet having a width greater than the width of the original, according to an example embodiment of the present invention.

Referring to FIG. 10, adjusting the position of the image data is explained, when the image data width is greater than the recording sheet width, according to an example embodiment of the present invention. Further, in this example, the user instruction for setting the image reading width to the maximum reading width has been input.

In FIG. 10, the original Do is placed on the original table 2b such that the center of the original Do corresponds to the original table center Co, which functions as the reading reference point Ro of the scanner 14. In this example, the original Do has the original width Wo. The recording sheet width Ws of the recording sheet S is specified to be smaller than the original width Wo, according to the user instruction. The image reading width of the scanner 14 is set to the maximum reading width Wm, according to the user instruction.

Since the image reading width is set to the maximum reading width Wm, the image data D1, which corresponds to the full size image of the original Do, has the width Wm. The dark portion of the image data D1 indicates data that has been added to the original image when the original Do is read at the maximum reading width. Further, in this example, the image data D1 is formed on the recording sheet S with reference at a side of the recording sheet S, which functions as the writing reference point Rs. Since the recording sheet width Ws is smaller than he original width Wo, the original width Wo is made smaller by the magnification ratio M than the recording sheet width Ws. As a result, the reduced size image data D2 is generated.

However, since the image data D2 has the width Wm*M, which is greater than the recording sheet width Ws, a portion of the image data D2, including a portion of the image read from the original Do, may not fit on the recording sheet S. Further, since the image data D2 is formed on the recording sheet with reference at the side of the recording sheet S, the center Ci of the image data D2 does not correspond to the center Cs of the recording sheet S, or the original table center Co.

In view of the above, the image forming apparatus 10 adjusts the position of the image data D2, for example, as described above referring to FIG. 9.

In this example, the position of the image data D2 is adjusted by shifting the position of the reading start point, which originally matches the position of the writing reference point Rs, in the direction indicated by the arrow shown in FIG. 10. In this example, the position of the writing reference point Rs may be defined based on the recording sheet width Ws. Further, in this example, the amount of shifting the position of the reading start point is calculated as the difference between the position of the image center Ci and the position of the recording sheet center Cs. Accordingly, the position of the image center Ci matches the position of the recording sheet center Cs, as illustrated in FIG. 10, when the image data D2 is formed on the recording sheet S with reference at the writing reference point Rs.

Further, in this example, since the image data width Wm*M of the image data D2 is greater than the recording sheet width Ws, a portion of the image data D2 may be deleted. The amount of data to be deleted from the image data D2 may be determined based on the amount of shifting the position of the reading start point, that is, the difference between the image center Ci and the recording sheet center Cs.

Figure 11:
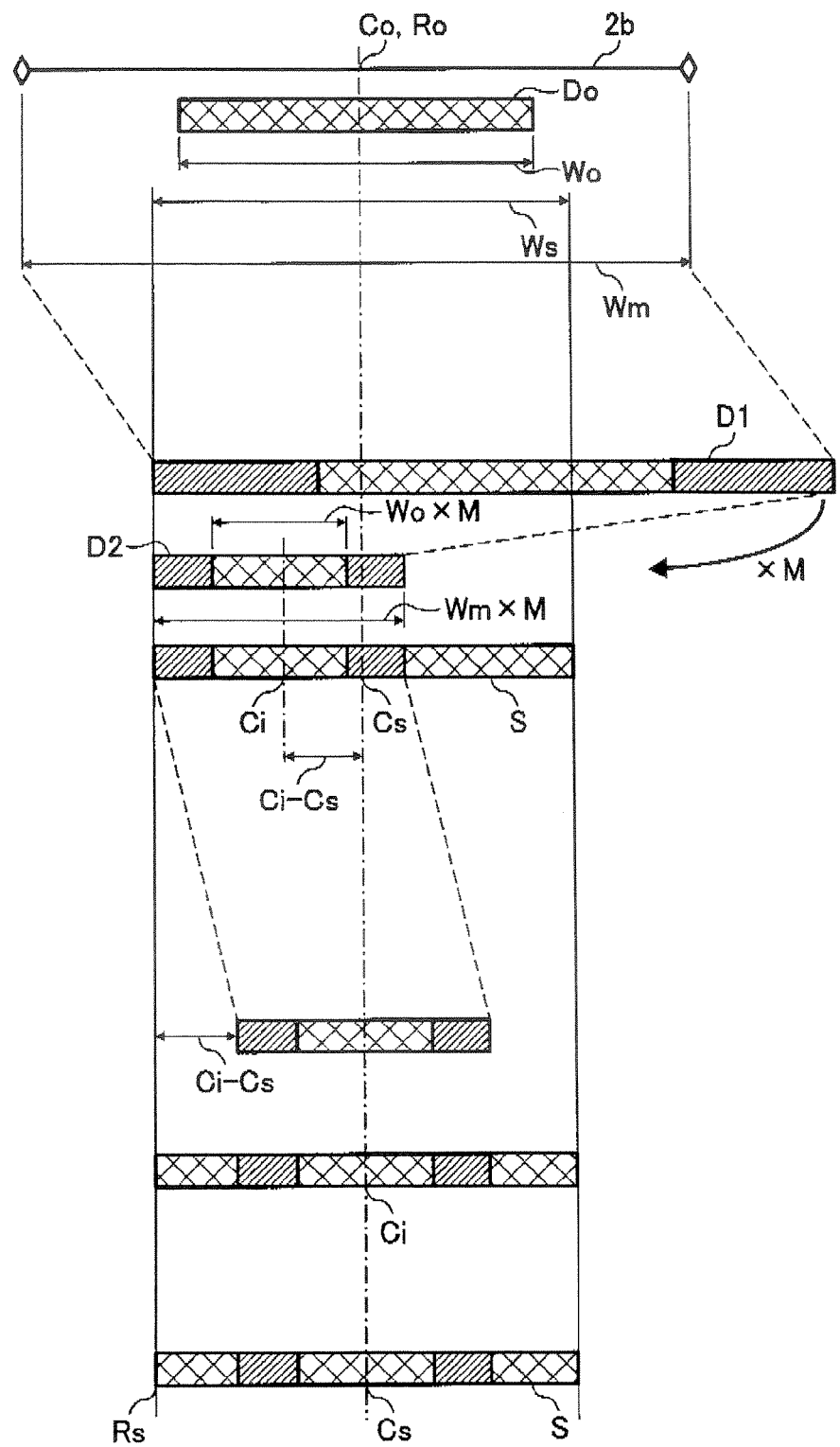
FIG. 11 is an illustration for adjusting a position of image data when copying an original onto a recording sheet having a width smaller than the width of the original, according to an example embodiment of the present invention.

Referring to FIG. 11, adjusting the position of the image data is explained, when the image data width is smaller than the recording sheet width, according to an example embodiment of the present invention. Further, in this example, the user instruction for setting the image reading width to the maximum reading width has been input.

In FIG. 11, the original Do is placed on the original table 2b such that the center of the original Do corresponds to the original table center Co, which functions as the reading reference point Ro of the scanner 14. In this example, the original Do has the original width Wo. The recording sheet width Ws of the recording sheet S is specified to be greater than the original width Wo, according to the user instruction. The image reading width of the scanner 14 is set to the maximum reading width Wm, according to the user instruction.

Since the image reading width is set to the maximum reading width Wm, the image data D1, which corresponds to the full size image of the original Do, has the maximum reading width Wm. The dark portion of the image data D1 indicates data that has been added to the original image when the original Do is read at the maximum reading width. Further, in this example, the image data D1 is reduced by the magnification ratio M to generate the image data D2.

However, since the image data D2 is formed on the recording sheet with reference at a side of the recording sheet S, which functions as the writing reference point Rs, the center Ci of the image data D2 does not correspond to the center Cs of the recording sheet S, or the original table center Co.

In view of the above, the image forming apparatus 10 adjusts the position of the image data D2, for example, as described above referring to FIG. 9.

In this example, the position of the image data D2 is adjusted by shifting the position of the image data D2 from the reading start point, which matches the position of the writing reference point Rs, in the direction indicated by the arrow shown in FIG. 10. In this example, the position of the writing reference point Rs may be defined based on the image data width Wm*M. Further, in this example, the amount of shifting the position of the image data is calculated as the difference between the position of the image center Ci and the position of the recording sheet center Cs. Accordingly, the position of the image center Ci matches the position of the recording sheet center Cs, as illustrated in FIG. 11, when the image data D2 is formed on the recording sheet S with reference at the writing reference point Rs.

Further, in this example, since the image data width Wm*M of the image data D2 is smaller than the recording sheet width Ws, data may be added to the image data D2. The amount of data to be added to the image data D2 may be determined based on the amount of shifting the position of the image data, that is, the difference between the position of the image center Ci and the position of the recording sheet center Cs. By adding the data having the background color, quality of the copied image may increase.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

For example, referring to FIG. 11, the image data D1 is reduced by the magnification ratio of M to generate the image data D2. However, since the original width is smaller than the recording sheet width Ws, the image data D1 may not be reduced. In such case, the position of the image data D1 may be shifted in a substantially manner as described above referring to FIG. 10.

Further, as described above, any one of the above-described and other methods of the present invention may be embodied in the form of a computer program stored in any desired kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image reading device, comprising:
   an image reader configured to read an original into image data by scanning the original in a main scanning direction at an image reading width while the original is being fed in a sub-scanning direction; and
   a controller configured to input reading settings information and set the image reading width to a maximum reading width of the image reader when the reading settings information comprises a user instruction for setting the image reading width to the maximum reading width;
   wherein the reading settings information further comprises at least one of recording sheet information including information indicating a width of a recording sheet on which the image data is to be formed, and magnification information including information indicating a magnification ratio between the size of image data read from the original and the size of the image data to be formed on the recording sheet; and
   wherein a position of the image data read from the original is adjusted relative to a reference point such that the center of the image data to be formed on the recording sheet matches the center of the recording sheet.

2. The image reading device of claim 1, wherein the controller is further configured to determine whether a width of the image data to be formed on the recording sheet is greater than the width of the recording sheet to generate a first determination result, when the reading settings information comprises the user instruction for setting the image reading width to the maximum reading width,
   wherein the width of the image data is obtained by multiplying the image reading width of the image reader with the magnification ratio obtained from the magnification information.

3. The image reading device of claim 2, wherein the controller is further configured to define a position of the reference point using the reading settings information based on the first determination result.

4. The image reading device of claim 3, further comprising:
   an image processing device configured to shift a position of a reading start point of the image data relative to the defined position of the reference point in the main scanning direction, when the first determination result indicates that the width of the image data to be formed on the recording sheet is greater than the width of the recording sheet.

5. The image reading device of claim 4, wherein an amount of shifting the position of the reading start point is determined based on the reading settings information.

6. The image reading device of claim 4, wherein the image processing device is further configured to delete data from the image data by an amount determined based on the reading settings information.

7. The image reading device of claim 3, further comprising:
   an image processing device configured to shift a position of the image data relative to the defined position of the reference point in the main scanning direction, when the first determination result indicates that the width of the image data to be formed on the recording sheet is smaller than the width of the recording sheet.

8. The image reading device of claim 7, wherein an amount of shifting the position of the image data is determined based on the reading settings information.

9. The image reading device of claim 7, wherein the image processing device is further configured to add data to the image data by an amount determined based on the reading settings information.

10. The image reading device of claim 1, further comprising:
    a document table configured to hold the original to be read by the image reader,
    wherein the image reader is configured to read the original with reference at the center of the document table.

11. The image reading device of claim 10, further comprising:
    an image forming device configured to form an image of the original according to the image data on the recording sheet with reference at one side of the recording sheet.

12. The image reading device of claim 1, further comprising:
    an original length detector configured to detect the length of the original in the sub-scanning direction to generate a detected original length,
    wherein the controller is further configured to set an image reading length of the image reader to the detected original length.

13. An image reading device, comprising:
    an image reader configured to read an original into image data by scanning the original in a main scanning direction at an image reading width while the original is being fed in a sub-scanning direction;
    a controller configured to input reading settings information and set the image reading width to a maximum reading width of the image reader when the reading settings information comprises a user instruction for setting the image reading width to the maximum reading width; and
    an original width detector configured to detect the width of the original in the main scanning direction to generate a detected original width,
    wherein the controller is configured to set the image reading width of the image reader based on the detected original width when the user instruction for setting the image reading width to the maximum reading width is not included in the reading settings information.

14. An image forming apparatus, comprising:
    an image reading device configured to read an original into image data by scanning the original in a main scanning direction at an image reading width while the original is being fed in a sub-scanning direction;
    an image forming device configured to form an image of the original according to the image data on a recording sheet;
    a user interface configured to input reading settings information,
    wherein the image reading width of the image reading device is set to a maximum reading width of the image reading device when the reading settings information comprises a user instruction for setting the image reading width to the maximum reading width; and
    an image processing device configured to adjust a position of the image data read from the original relative to a reference point such that the center of the image data to be formed on the recording sheet matches the center of the recording sheet, when the reading settings information comprises the user instruction for setting the image reading width to the maximum reading width.

15. The apparatus of claim 14, wherein the user interface requests a user to input recording sheet information as the reading settings information, when the reading settings information comprises the user instruction for setting the image reading width to the maximum reading width.

16. The apparatus of claim 14, wherein the position of the image data is adjusted based on a first determination result indicating whether a width of the image data to be formed on the recording sheet is greater than a width of the recording sheet, with the width of the image data is obtained using the image reading width that is set to the maximum reading width.

17. The apparatus of claim 14, wherein the image processing device is further configured to add or delete data to or from the image data to be formed on the recording sheet by an amount determined based on the reading settings information.

* * * * *